US012097632B2

(12) United States Patent
Webster et al.

(10) Patent No.: US 12,097,632 B2
(45) Date of Patent: Sep. 24, 2024

(54) PEPPERONI SLICING SYSTEM

(71) Applicant: EZ Topping Systems, LLC, Mason, OH (US)

(72) Inventors: Ross Webster, Cincinnati, OH (US); Gary Kestin, Mason, OH (US)

(73) Assignee: EZ Topping Systems, LLC, Mason, OH (US)

(*) Notice: Subject to any disclaimer, the term of this patent is extended or adjusted under 35 U.S.C. 154(b) by 0 days.

(21) Appl. No.: 18/249,818

(22) PCT Filed: Oct. 20, 2021

(86) PCT No.: PCT/US2021/055787
§ 371 (c)(1),
(2) Date: Apr. 20, 2023

(87) PCT Pub. No.: WO2022/093592
PCT Pub. Date: May 5, 2022

(65) Prior Publication Data
US 2023/0390955 A1 Dec. 7, 2023

Related U.S. Application Data

(60) Provisional application No. 63/105,445, filed on Oct. 26, 2020.

(51) Int. Cl.
*B26D 7/06* (2006.01)
*A21C 9/04* (2006.01)
(Continued)

(52) U.S. Cl.
CPC .............. *B26D 7/0683* (2013.01); *A21C 9/04* (2013.01); *B26D 1/28* (2013.01); *B26D 7/0641* (2013.01); *B26D 7/32* (2013.01); *B26D 2210/02* (2013.01)

(58) Field of Classification Search
CPC ............... B26D 7/0683; B26D 7/0641; B26D 2210/02; B26D 7/32; B26D 1/28; B26D 1/147; B26D 7/08; B26D 7/1818; B26D 3/24; B26D 1/02; B26D 3/16; B26D 5/005; B26D 9/00; A21C 9/04; A21D 13/22;
(Continued)

(56) References Cited

U.S. PATENT DOCUMENTS 3,428,102 A * 2/1969 Knecht .................... B26D 7/32
83/88
3,782,230 A * 1/1974 Bettcher .................. B26D 7/12
83/411.2
(Continued)

*Primary Examiner* — Ghassem Alie
(74) *Attorney, Agent, or Firm* — Jenei LLC

(57) ABSTRACT

A slicing machine includes an upper housing having feeder tube(s). A motor-driven cutting plate is horizontally attached beneath the upper housing for rotation and positioned to perpendicularly receive elongate food article(s) from the feeder tube(s) at a respective position offset from a center of rotation of the cutting plate. Reverse involute cutting blade(s) attached to the cutting plate that slices the elongate food article and having a cutting edge with an upward bevel. A curved slot formed through the cutting plate beneath the cutting edge to receive slices of the elongate food article. A base housing positioned below the upper housing has a turntable that supports a food substrate that receives the slices of the elongate food article.

5 Claims, 15 Drawing Sheets

(51) Int. Cl.
*B26D 1/28* (2006.01)
*B26D 7/32* (2006.01)

(58) Field of Classification Search
CPC ..... A21D 13/41; Y10T 83/162; Y10T 83/202; Y10T 83/9372; Y10T 83/2216
USPC ............... 83/78, 76.1, 165, 663; 426/518
See application file for complete search history.

(56) References Cited

U.S. PATENT DOCUMENTS

| | | |
|---|---|---|
| 5,640,897 A | 6/1997 | Fehr |
| 8,710,408 B2 | 4/2014 | Khatchadourian et al. |
| 2006/0075870 A1 | 4/2006 | Wangler et al. |
| 2011/0209661 A1 | 9/2011 | Fritz-Jung et al. |
| 2014/0087048 A1 | 3/2014 | Webster et al. |
| 2023/0028538 A1 | 1/2023 | Rao et al. |

\* cited by examiner

PEPPERONI SLICING SYSTEM

CROSS REFERENCE TO RELATED APPLICATION(S)

This patent application is a National Stage application filed under 35 U.S.C. § 371 of International Application No. PCT/US21/55787, entitled "PEPPERONI SLICING SYSTEM" and filed on Oct. 20, 2021, which claims the benefit and priority of U.S. Provisional Application Ser. No. 63/105,445 entitled "PEPPERONI SLICING SYSTEM" filed Oct. 26, 2020, the disclosure of which are incorporated by reference herein in their entirety as part of the present application.

BACKGROUND

1. Technical Field

The present disclosure generally relates to food slicing machines, and more specifically to sausage slicing machines.

2. Description of the Related Art

Many restaurants and institutional food services rely on production of pepperoni pizzas as a frequently sold and served food item. One of the most time-consuming steps in assembling a pizza is applying pepperoni to the pie. Typically, packaged, pre-sliced pepperonis are used. It is time consuming to manually place prepackaged, pre-sliced pepperonis onto the pie in an even distribution. The selection of prepackaged, pre-sliced meats are limited and are not as fresh tasting as fresh-sliced pepperonis.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
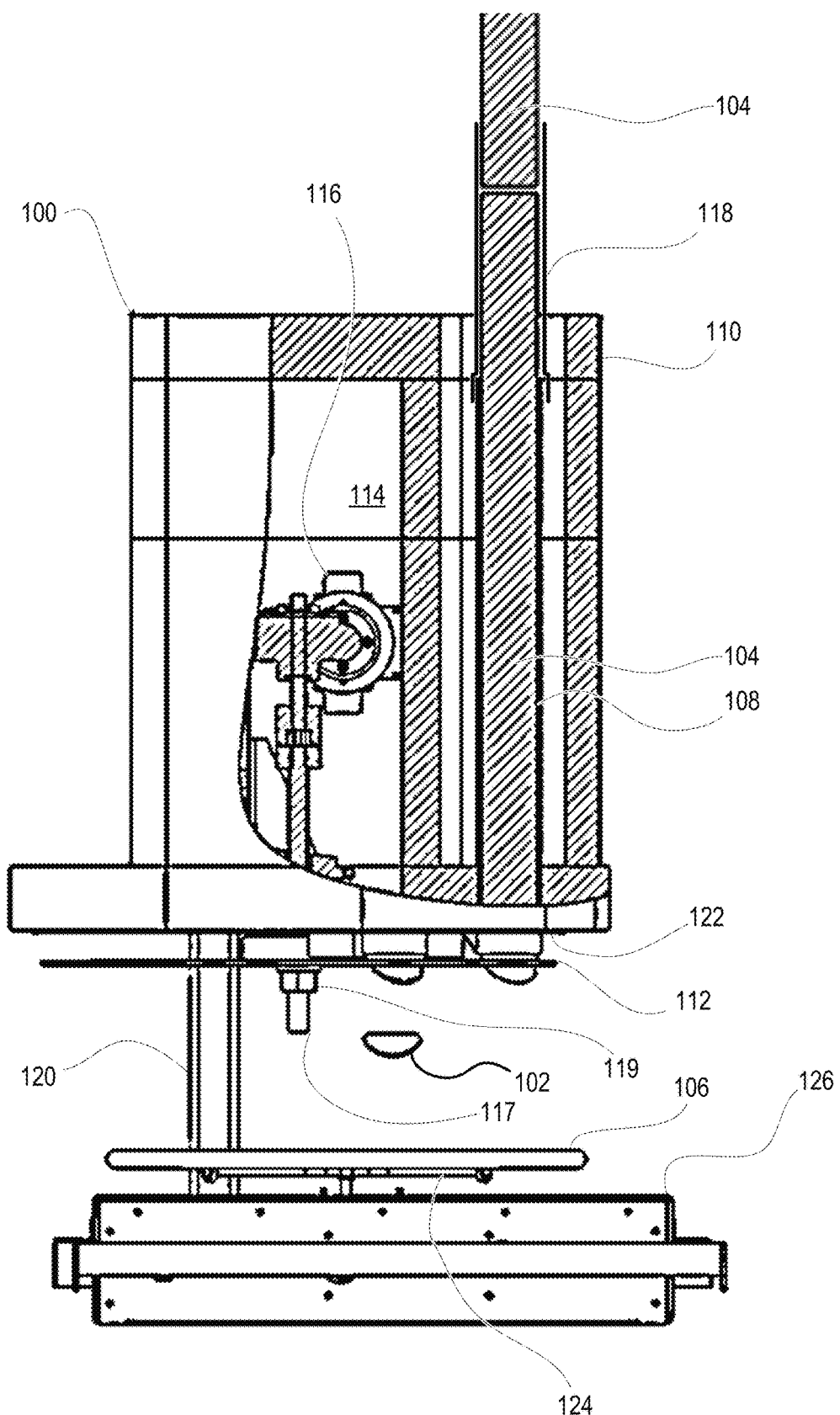
FIG. 1 is a front cutaway view and a side view of a pepperoni slicing machine, according to one or more embodiments.
Figure 2:
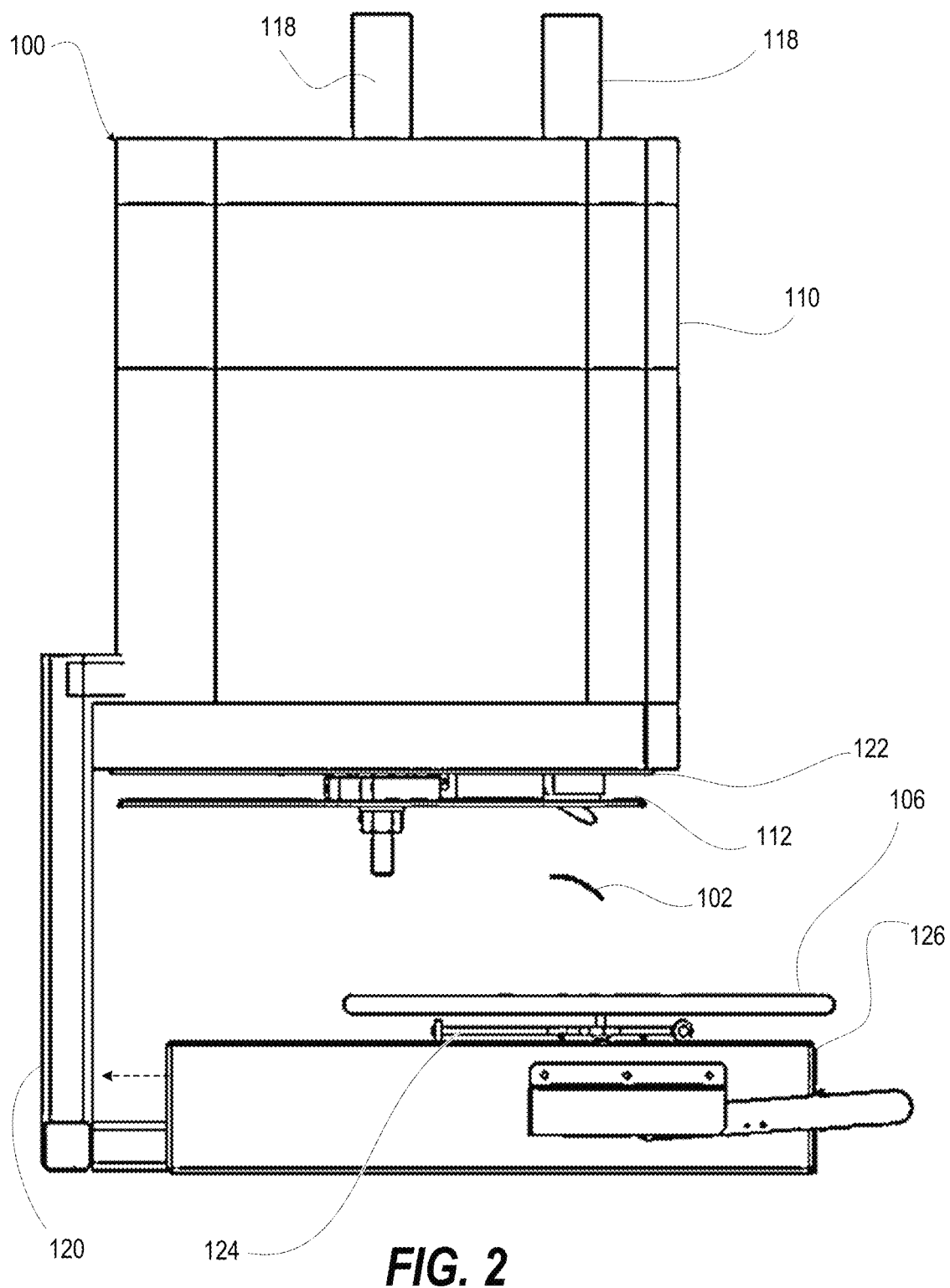
FIG. 2 is a side view of the pepperoni slicing machine, according to one or more embodiments.

FIGS. 1-2 depict respectively a front cutaway view and a side view of a pepperoni slicing machine 100 that cuts slices 102 of pepperoni from a solid pepperoni stick 104 and drops the slices 102 onto a pizza pie 106 below. In one or more embodiments, the pepperoni slicing machine 100 is intended for use in commercial applications such as restaurants, where counter space is limited and increased production of pepperoni pizzas is needed. The present disclosure provides an improvement on previous attempts to innovate pizzas made to order, as disclosed in U.S. Patent Publication No. 20140087048 to Webster, entitled "Pizza Pie Preparation Device and Related Methods", published 27 Mar. 2014, the disclosure of which is incorporated by reference in its entirety.

With particular reference to FIG. 1, the pepperoni slicing machine 100 holds pepperoni sticks in respective one or more feeder tubes 108 that are part of an upper housing 110 mounted above a cutting disk assembly 112 and pizza pie 106. In one or more embodiments, the upper housing 110 is made from insulating foam and incorporates an ice well 114 so that ice can be packed around the feeder tubes 108. A drain (not shown) at the bottom of the ice well 114 allows for water drainage. The upper housing 110 also houses a variable speed drive motor 116 that drives the cutting disk assembly 112 via cutting disk shaft 117 attached by arbor nut 119. Extension tubes 118 can be added to the feeder tubes 108 so that multiple pepperoni sticks 104 can be loaded into each feeder tube 108. The upper housing 110 is supported above the cutting disk assembly 112 by a support frame 120 and support plate 122. The pizza pie 106 is placed on a turntable 124 that is part of a base housing 126. The base housing 126 incorporates a variable speed drive motor (not shown) to drive the turntable 124.

Figure 3:
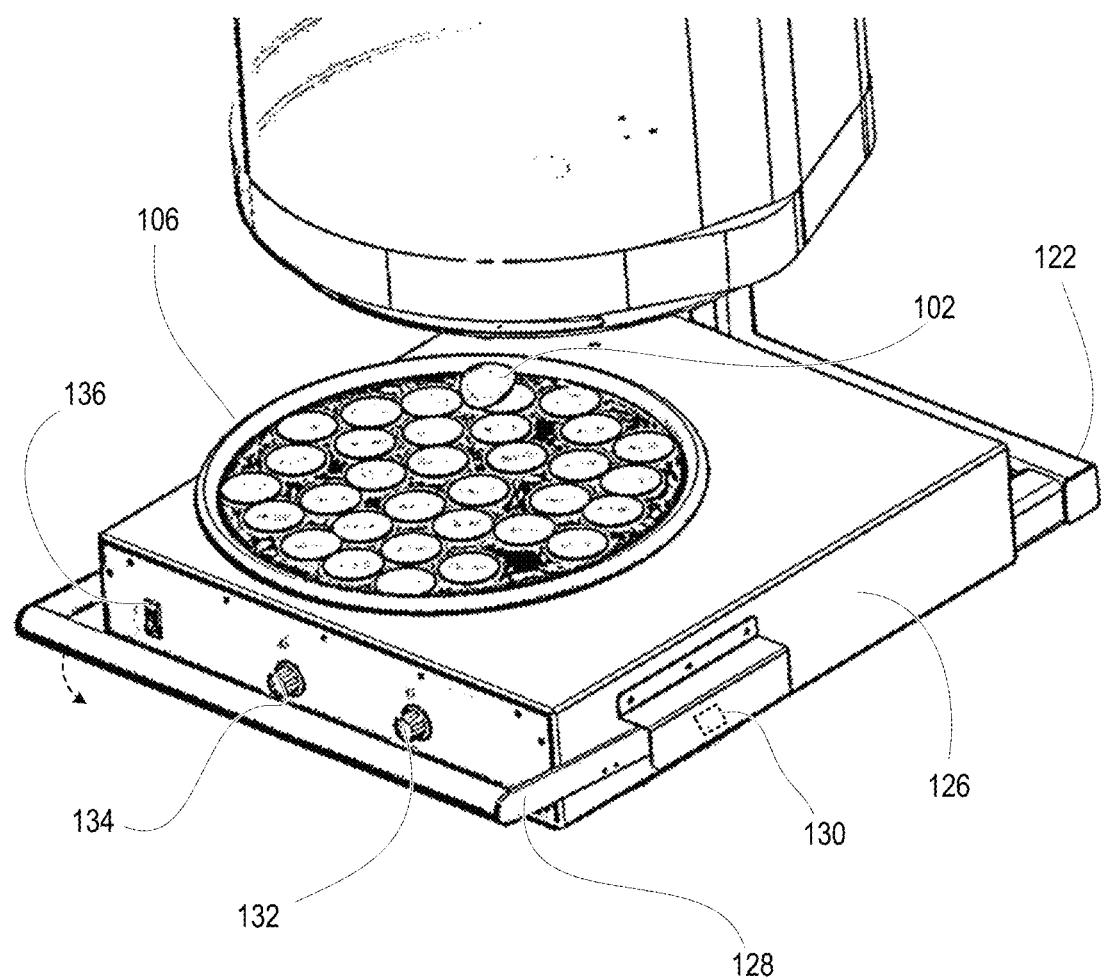
FIG. 3 is an isometric detail view of a base housing of the pepperoni slicing machine, according to one or more embodiments.

FIG. 3 depicts an isometric detail view of the base housing 126. The base housing 126 is allowed to translate forward and back on a base frame 127 of the support frame 120 using linear bearings or glides. This allows the pizza pie 106 to be continually repositioned while the pepperoni slices 102 are dropping down from the cutting disk assembly 112 above. An operator can move the base housing using a handlebar 128 located at the front of the base housing 126. The handlebar 128 incorporates an electrical switch 130 that makes contact when the handlebar 128 is depressed. The electrical switch 130 activates both the turntable 124 (FIG. 1) and cutting disk assembly 112 (FIG. 1). Control knobs 132, 134 are located on the front of the base housing 126 and respectively provides speed controls for the turntable 124 (FIG. 1) and cutting disk assembly 112 (FIG. 1). The rate of slices cut per minute is controlled by the rotation speed of the cutting disk assembly 112. A power switch 136 is also included on base housing 126.

Additionally, the pepperoni slicing machine 100 discussed herein may also be incorporated into other features of the kitchen environment such as a built-in refrigerator, cabinet, countertop, and the like. In one or more embodiments, the pepperoni slicing machine 100 also advantageously includes a refrigeration unit for maintaining the pepperoni sticks or other topping sticks within a preset temperature range for producing consistent sliced toppings.

Figure 4:
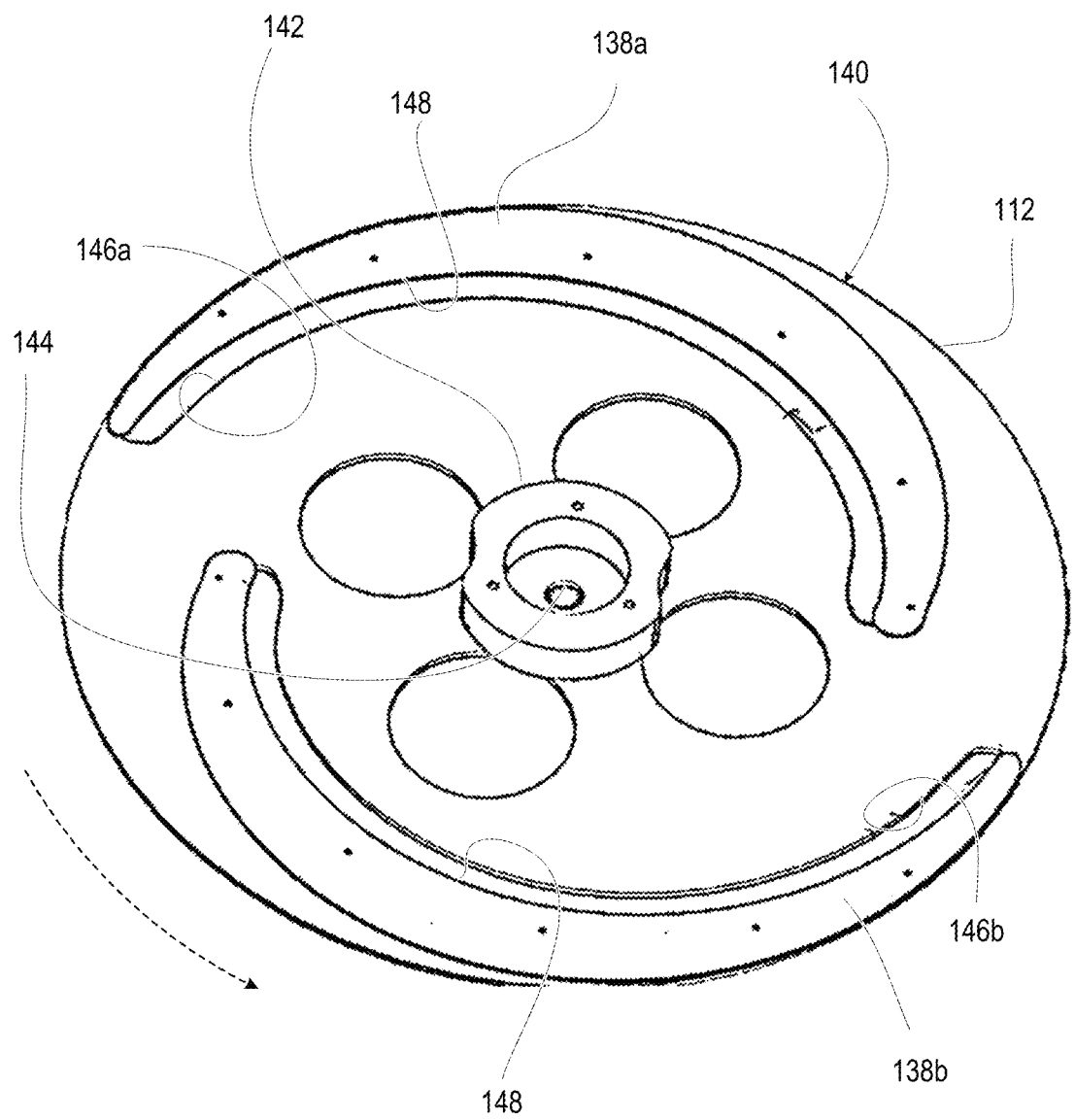
FIG. 4 depicts a top isometric view of a cutting disk assembly of the pepperoni slicing machine, according to one or more embodiments.

FIG. 4 depicts a top isometric view of the cutting disk assembly 112 that consists of four components: two cutting blades 138a, 138b secured to a cutting disk plate 140 and a central cam 142. As the cutting disk plate 140 rotates, each cutting blade 138a, 138b cuts a slice of pepperoni. With two blades on the cutting disk plate 140, two slices are cut with each 360-degree rotation of the disk. For clarity, two cutting blades 138a, 138b are included, although in other embodiments, one cutting blade or more than two cutting blades can be included.

Each cutting blade 138a, 138b can be a reverse involute shape with a radius to a rotational center 144 that decreases with rotation, thus progressively slicing through the pepperoni stick. Cutting each slice begins at the blade's long radius end and is completed at the its short radius end. The degree of rotation as related to the amount of rotation required to traverses a respective cutting blade 138a, 138b is set to provide an effective cutting action through even a soft pepperoni stick. The angle of rotation that the cutting disk plate 140 will turn for a selected cutting blade 138a, 138b to cut a single slice can be from 90 degrees to 165 degrees, depending on the configuration and length of the cutting blade 138a, 138b. As each slice is cut, the slice drops through a slot opening 146a, 146b formed in the cutting disk plate 140 adjacent to a cutting edge 148 of each cutting blade 138a, 138b respectively.

Figure 5:
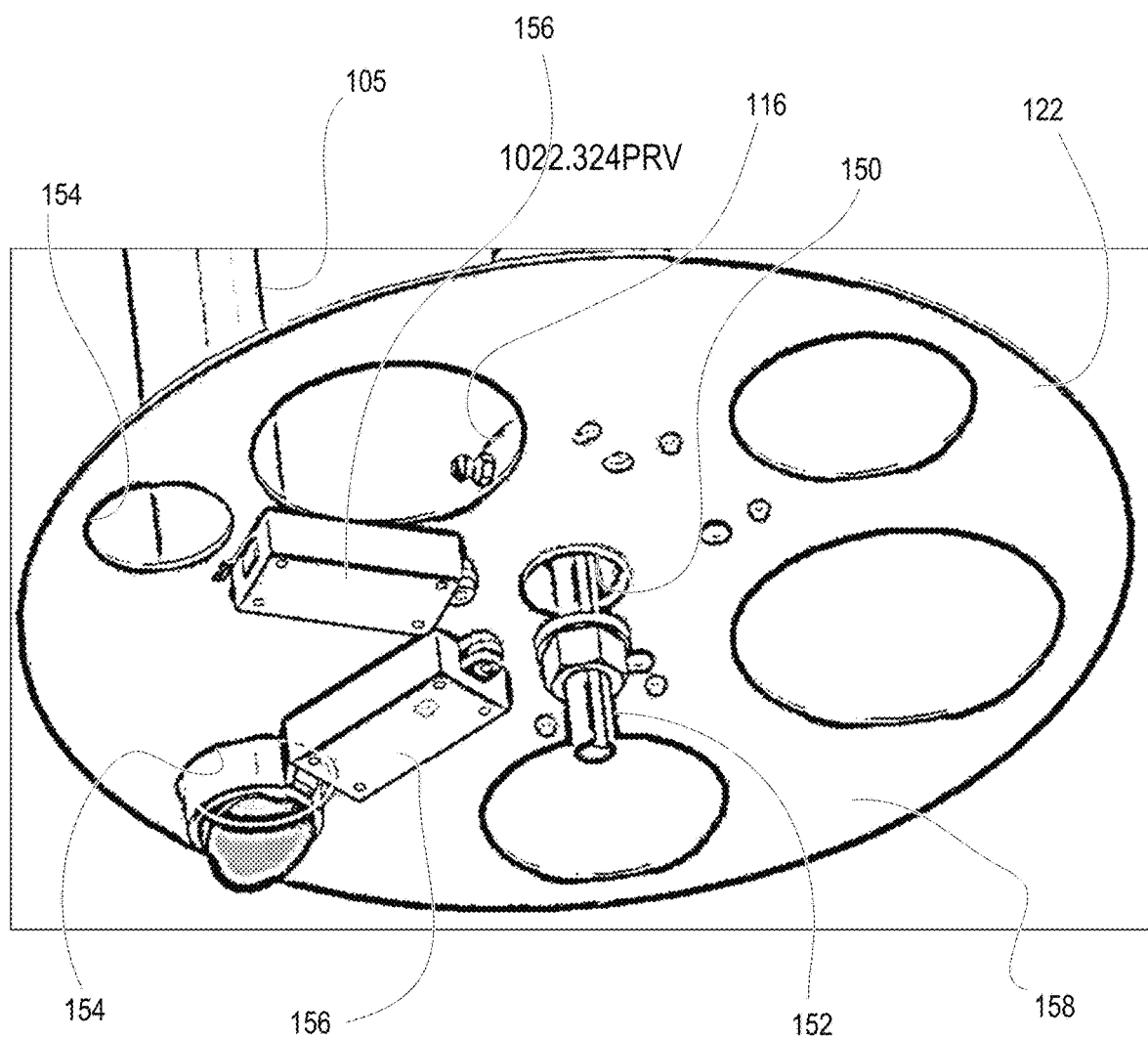
FIG. 5 is a lower isometric view of a support plate that is mounted to an underside of an upper housing of the pepperoni slicing machine, according to one or more embodiments.

FIG. 5 depicts a lower isometric view of the support plate 122 that is mounted to an underside of upper housing 110 (FIG. 1). Support plate 122 is stationary and provides a central opening 150 through which a drive shaft 152 extends from the variable speed drive motor 116 to receive the central cam 142 and the cutting disk plate 140 of the cutting disk assembly 112 (FIG. 4). One or two tube holes 154 receives a bottom portion of the feeder tube 108. Stabilizer assemblies 156 are mounted to a bottom side 158 of the support plate 122 for a corresponding feeder tube 108.

Figure 6:
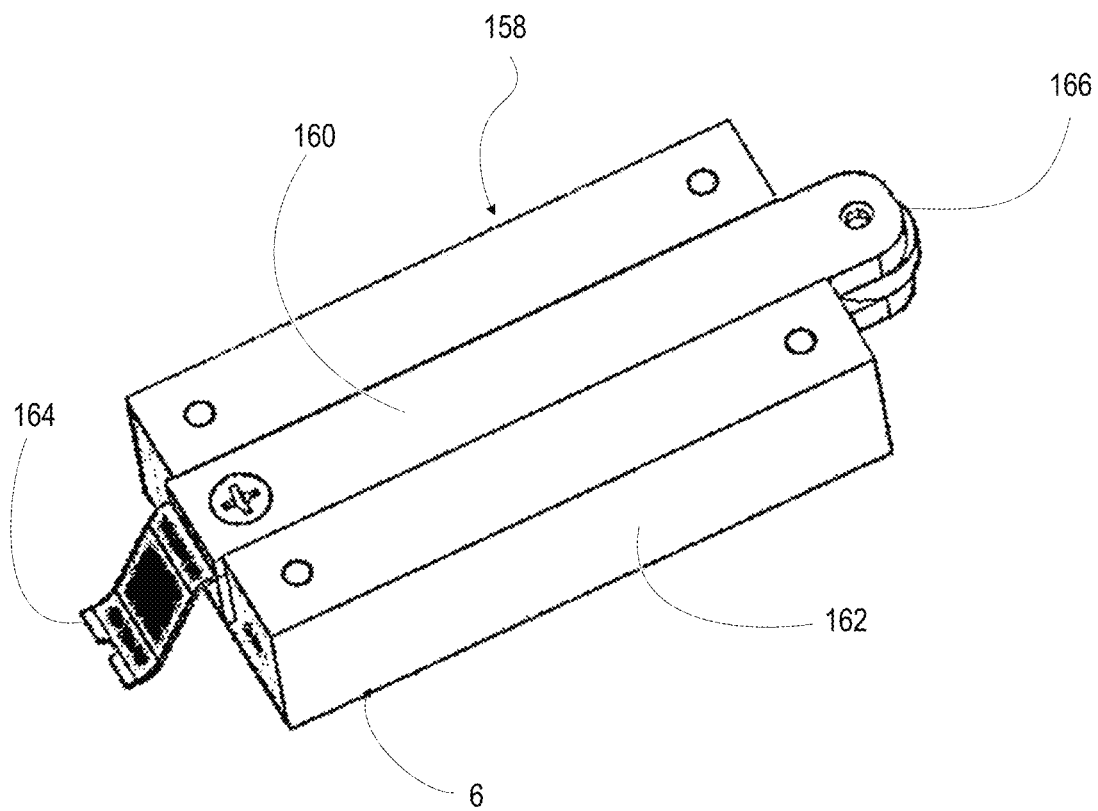
FIG. 6 is an isometric view of a stabilizer assembly of the pepperoni slicing machine, according to one or more embodiments.

FIG. 6 depicts an isometric view of one stabilizer assembly 158 that includes four components: (i) a cam follower 160; (ii) a cam follower block 162; (iii) a stabilizer tang 164 on an outward end of the cam follower 160; and (iv) a roller bearing 166 on an inward end of the cam follower 160.

Figure 7:
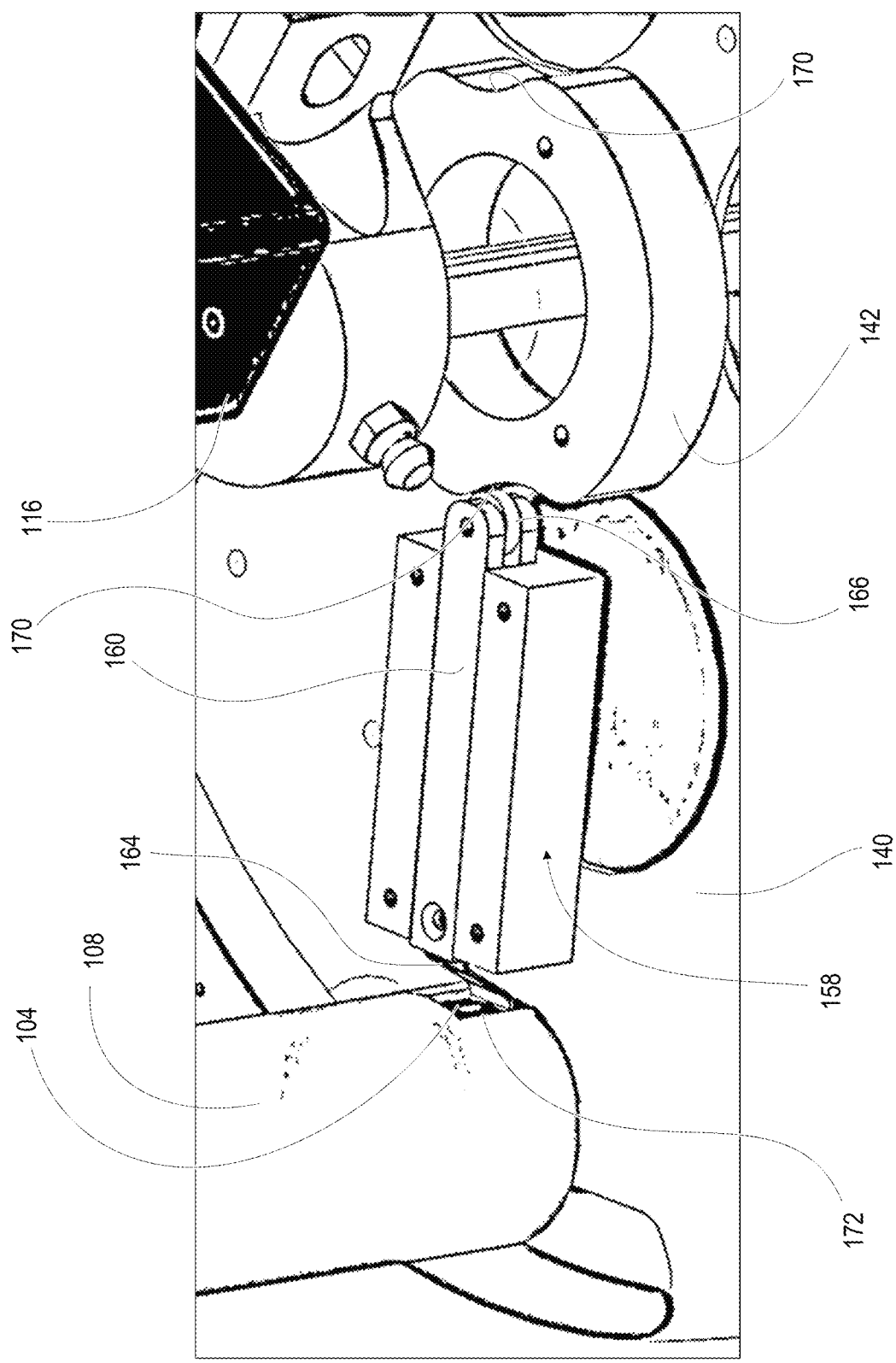
FIG. 7 is a top isometric detail view of the cutting disk assembly, a variable speed drive motor, a feeder tube and one stabilizer assembly as assembled with the support plate omitted, according to one or more embodiments.

FIG. 7 depicts a top isometric detail view of the cutting disk assembly 112, the variable speed drive motor 116, the feeder tube 108 and one stabilizer assembly 158 as assembled with the support plate 122 (FIG. 4) omitted. The cam follower 160 is spring loaded to longitudinally extend inwardly from the cam follower block 162 such that the roller bearing 166 maintains contact with the central cam 142 at all times. As the central cam 142 rotates with the cutting disk assembly 112, the central cam 142 actuates the cam follower 160. The central cam 142 has a radially varying outer surface 168 with two concave indents 170 on opposite sides that imparts inward and outward motion to the cam follower 160. When the cam follower 160 is not registered to one of the two concave indents 170, the tang 164 is extended outwardly by the cam follower 160 into an inwardly directed window 172 of the feeder tube 108 to impinge on the pepperoni stick 104.

Figure 8:
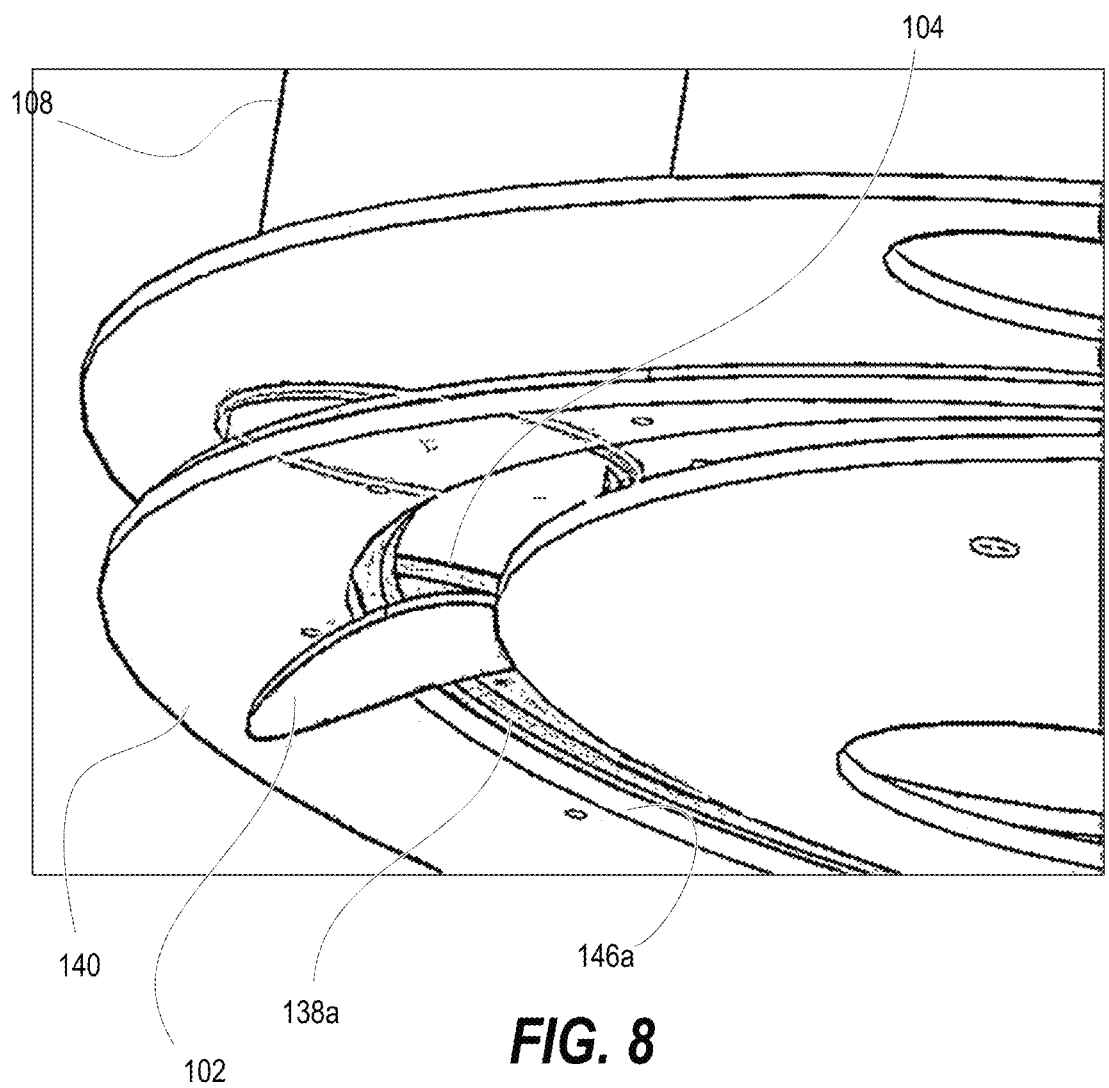
FIG. 8 is a lower isometric view of the assembled support plate and cutting disk assembly cutting a slice from the pepperoni stick guided by the feeder tube, according to one or more embodiments.
Figure 9:
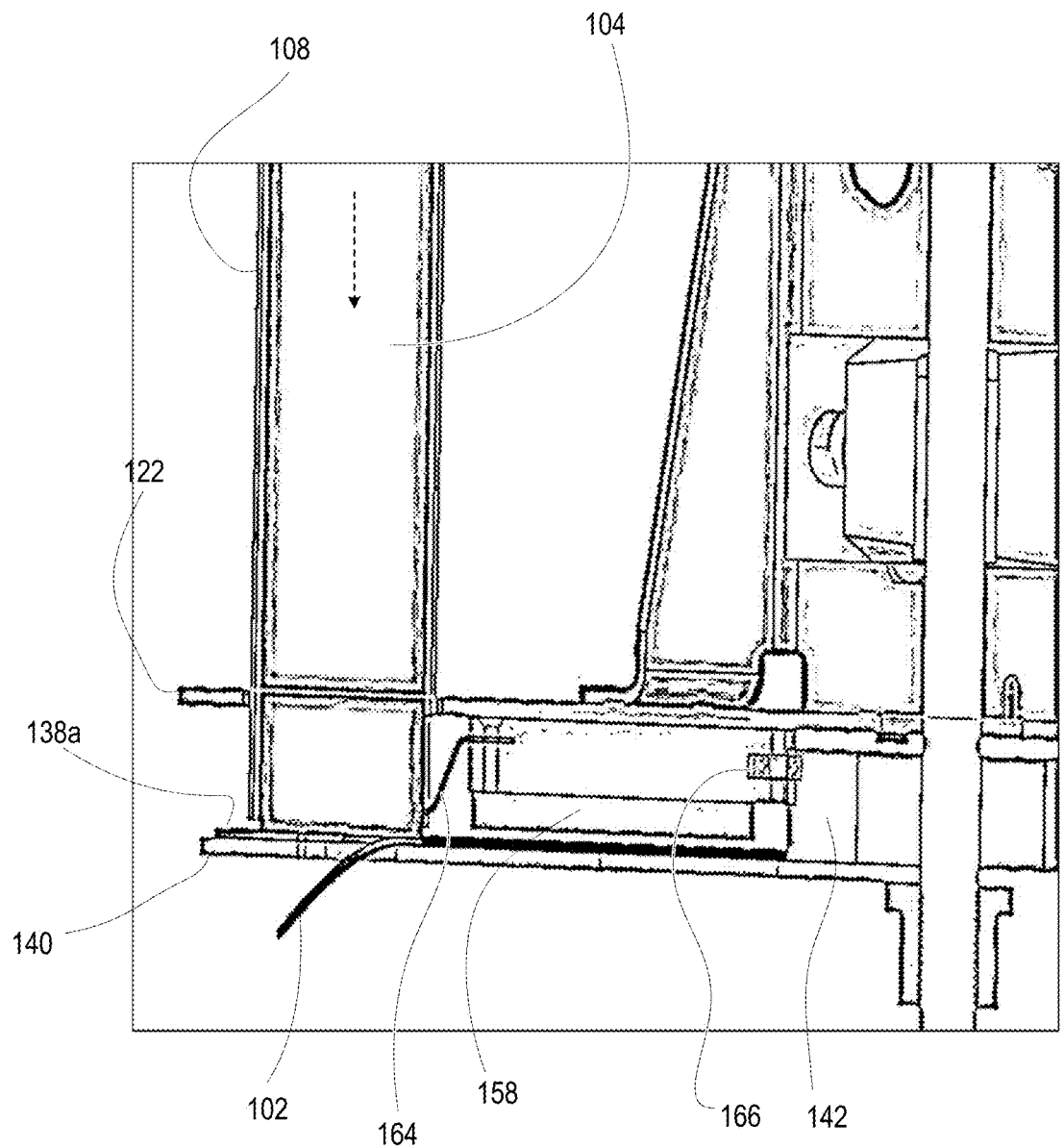
FIG. 9 is a side cutaway view of the assembled support plate and cutting disk assembly cutting a slice from the pepperoni stick guided by the feeder tube, according to one or more embodiments.

FIGS. 8-9 depict respectively a lower isometric view and a side cutaway view of the assembled support plate 122 and cutting disk assembly 112 cutting a slice 102 from the pepperoni stick 104 guided by the feeder tube 108. The tang 164 stabilizes the pepperoni stick 104 during the cutting process. The shape of the tang 164 also adds some vertical force down on the pepperoni stick 104, pushing on the pepperoni stick 104 down onto the selected cutting blade 138a, 138b during the cutting process. This stabilizing action during the cutting process produces clean cut slices. With particular reference to FIG. 9, the pepperoni stick 104 rests on top of the cutting disk plate 140 and is fed by gravity through the feeder tube 108. As the cutting disk assembly 112 rotates, the pepperoni stick 104 is sliced by the selected cutting blade 138a, 138b and falls though the selected slot opening 146a, 146b in the cutting disk plate 140.

Figure 10:
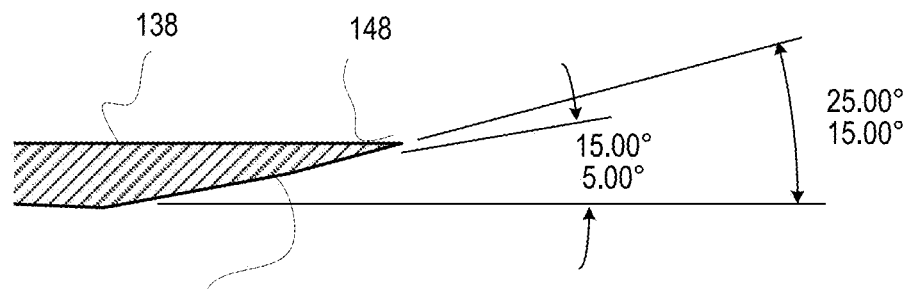
FIG. 10 is a side cross sectional view of a cutting edge of a selected cutting blade of the pepperoni slicing machine, according to one or more embodiments.

FIG. 10 depicts a side cross sectional view of the cutting edge 148 of a selected cutting blade 138a, 138b. The cutting edge 148 of the cutting blade 138a, 138b is ground with a bevel 174 on the bottom side only. The bevel 174 may be a compound bevel, having a primary and secondary grind, with the primary bevel angle at 5° to 15° with a secondary bevel at 15° to 25°.

Figure 11:
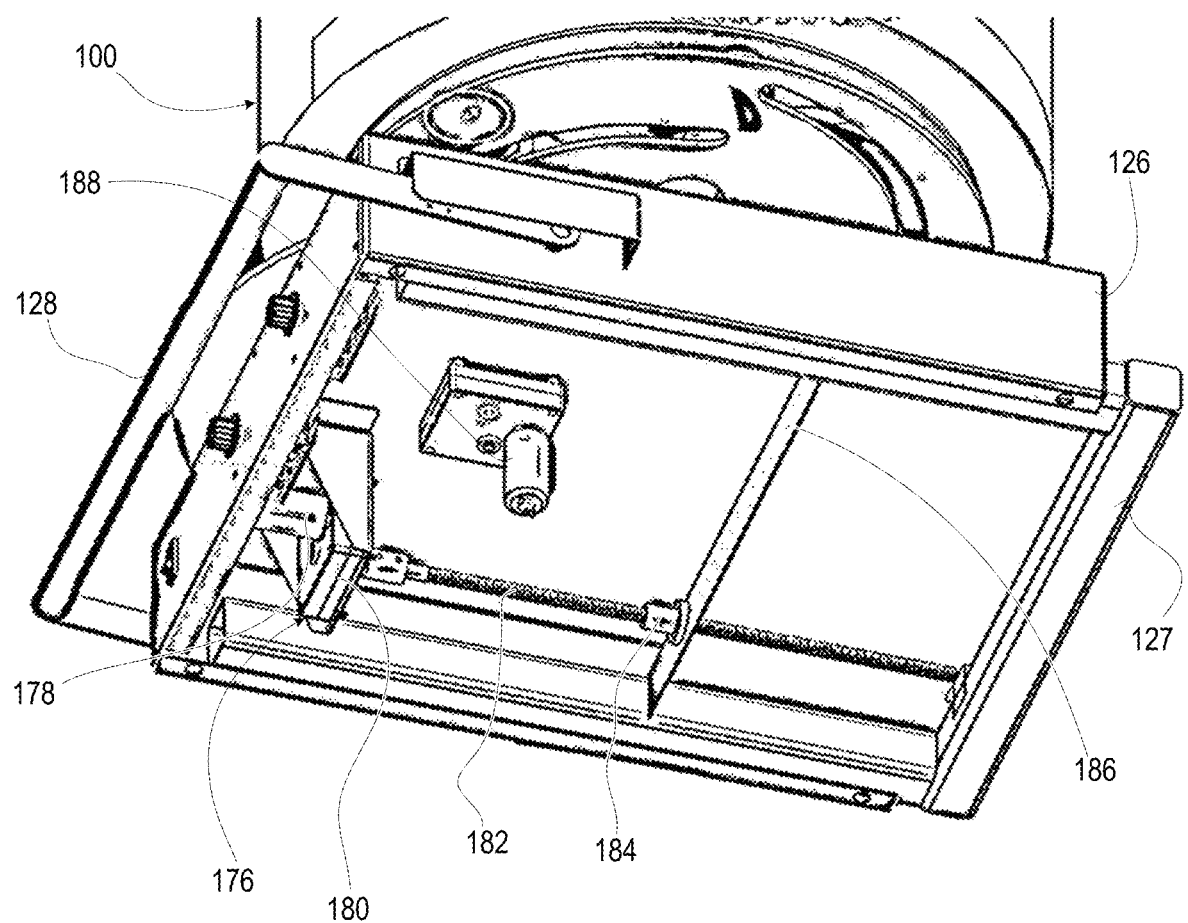
FIG. 11 is a bottom isometric view of the base housing of the pepperoni slicing machine, according to one or more embodiments.

FIG. 11 depicts an automatic version of the pepperoni slicing machine 100 having a base drive assembly 176 mounted in the base housing 126. As an alternative to manual movement of the handlebar 128, the base drive assembly 176 translates the base housing 126 forward and back. The base drive assembly 176 includes a base drive motor 178 that, via a gearbox 180, turns a lead screw 182 that is aligned with the direction of longitudinal movement between the base housing 126 and the base frame 127. Base drive motor 178 selectively turns clockwise or counterclockwise. As the lead screw 182 turns, the lead screw 182 screws in or out of a lead screw nut 184 which is fixed to an internal frame member 186 of the base frame 127. The portion of the lead screw 182 between the lead screw nut 182 and the gearbox 178 corresponds to an amount of translation of the base housing 126. Speed and direction of the base drive motor 178 is controlled by a PLC. PLC can also control speed of turntable drive motor 188 in coordination with speed of base drive motor 178.

Figure 12:
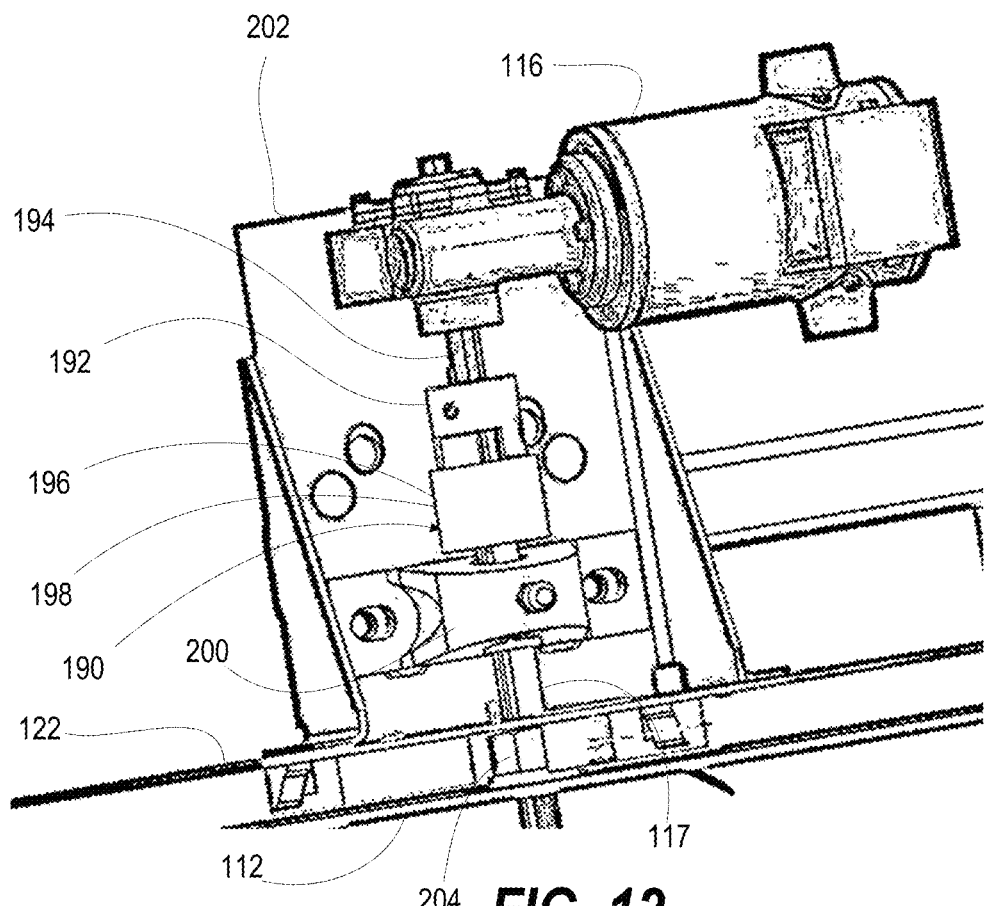
FIG. 12 is a side view of a one directional clutch assembly that transfers torque from a variable speed drive motor to the cutting disk assembly, according to one or more embodiments.
Figure 13:
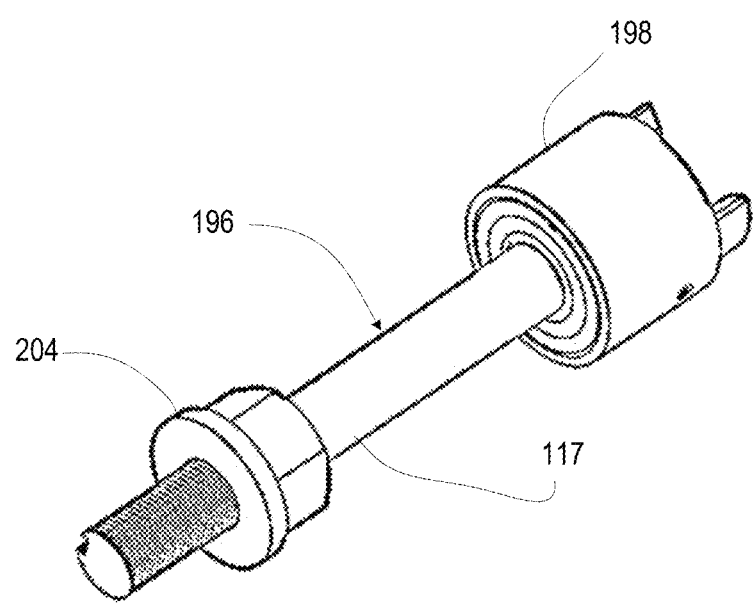
FIG. 13 depicts a lower drive coupling half that includes a Sprag clutch attached to a downward extending and keyed cutting disk shaft and arbor nut, according to one or more embodiments.

FIG. 12 depicts a side view of the variable speed drive motor 116 driving the cutting disk assembly 112 via a one directional clutch assembly 190. The one directional clutch assembly 190 isolates the inertia of the cutting disk assembly 112 from the variable speed drive motor 116. The one directional clutch assembly 190 includes an upper drive coupling half 192 that receives a shaft 194 of the variable speed drive motor 116. FIG. 13 depicts a lower drive coupling half 196 that includes a Sprag clutch 198 attached to a downward extending and keyed and end threaded cutting disk shaft 117. Returning to FIG. 12, the Sprag clutch 198 engages the upper drive coupling half 192. The lower drive coupling half 196 includes that is held vertically for rotation in a bearing block 200 fastened to a vertical fixture 202 that is attached to the support frame 120 (FIG. 1) and support plate 122. cutting disk shaft 117 is attached in part to the cutting disk assembly 112 by a stuck arbor nut 204 that is opposed from below by the arbor nut 119 (FIG. 1).

Figure 14:
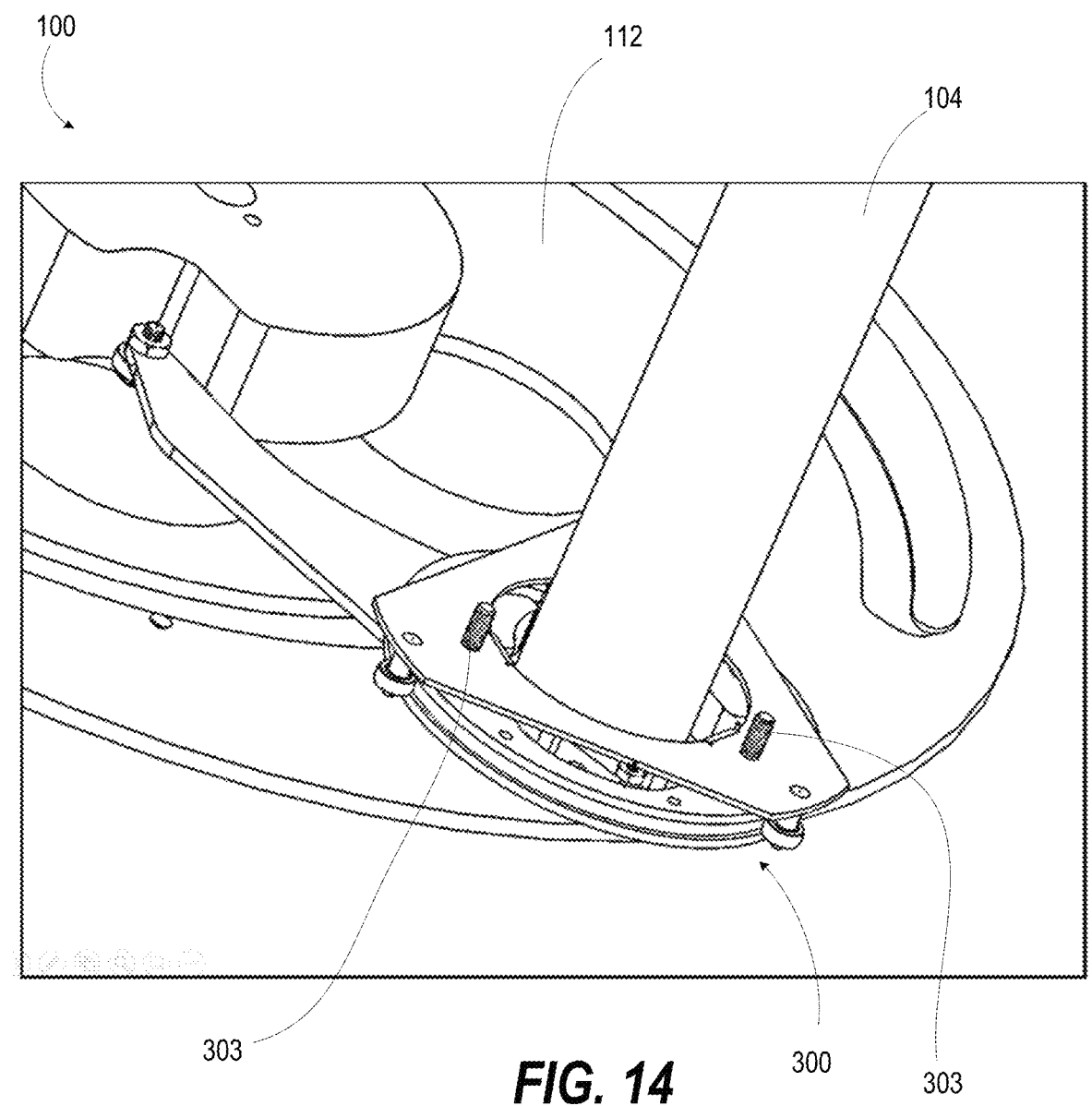
FIG. 14 depicts a top three-dimensional view of a stabilizer assembly encompassing an elongate food product, according to one or more embodiments.

FIGS. 14-17 depict the pepperoni slicing machine 100 (FIG. 1) having an alternate stabilizer assembly 300. FIG. 14 depicts a top three-dimensional view of the stabilizer assembly 300 encompassing an elongate food product, such as a solid pepperoni stick 104. The stabilizer assembly 300 grips the solid pepperoni stick 104 during slicing and then releases between slices to allow the solid pepperoni stick 104 to reposition for the next slice The stabilizer assembly 300 mounts to an underside of the support plate 122 (FIG. 5), which is omitted in FIG. 14 to depict the cutting disk assembly 112 that rotates below the support plate 122 (FIG. 1). A triangular stabilizer mounting plate 301 of the stabilizer assembly 300 is fastened by three fasteners 303 to the underside of the support plate 122 (FIG. 5) to secure the stabilizer assembly 300.

Figure 15:
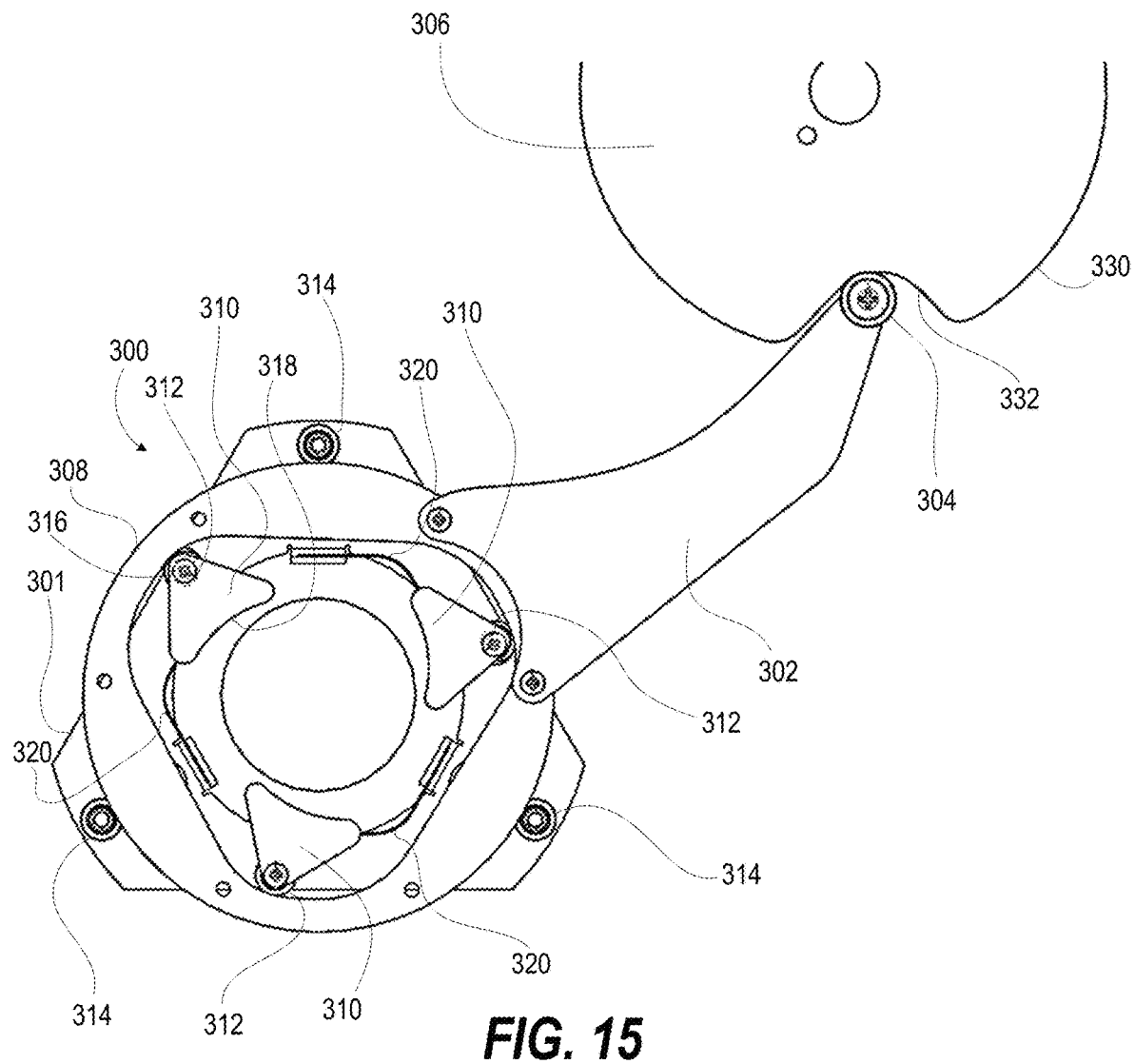
FIG. 15 depicts a bottom view of the stabilizer assembly including a stabilizer actuator arm presenting an arm roller bearing that contacts a central cam, according to one or more embodiments.

FIG. 15 depicts a bottom view of the stabilizer assembly 300 including a stabilizer actuator arm 302 presenting an arm roller bearing 304 that contacts a central cam 306. The stabilizer assembly 300 has six components: (i) the stabilizer mounting plate 301; (ii) a cam ring 308; (iii) three (3) cam followers 310; (iv) the stabilizer actuator arm 302; (v) three (3) inner roller bearings 312 attached respectively to the cam followers 310 and (vi) three (3) outer roller bearings 314 supported by the stabilizer mounting plate 301 that engage the cam ring 308 for rotation by the stabilizer actuator arm 302. Each cam follower 310 is generally triangular with an outer apex 316 receiving a corresponding inner roller bearing 314 and an inner surface 318 rounded to approximate the curvature of the outer surface of solid pepperoni stick 104 (FIG. 14). Each cam follower 310 is mounted to the top stabilizer mounting plate 301 by a respective spring bar 320.

Figure 16:
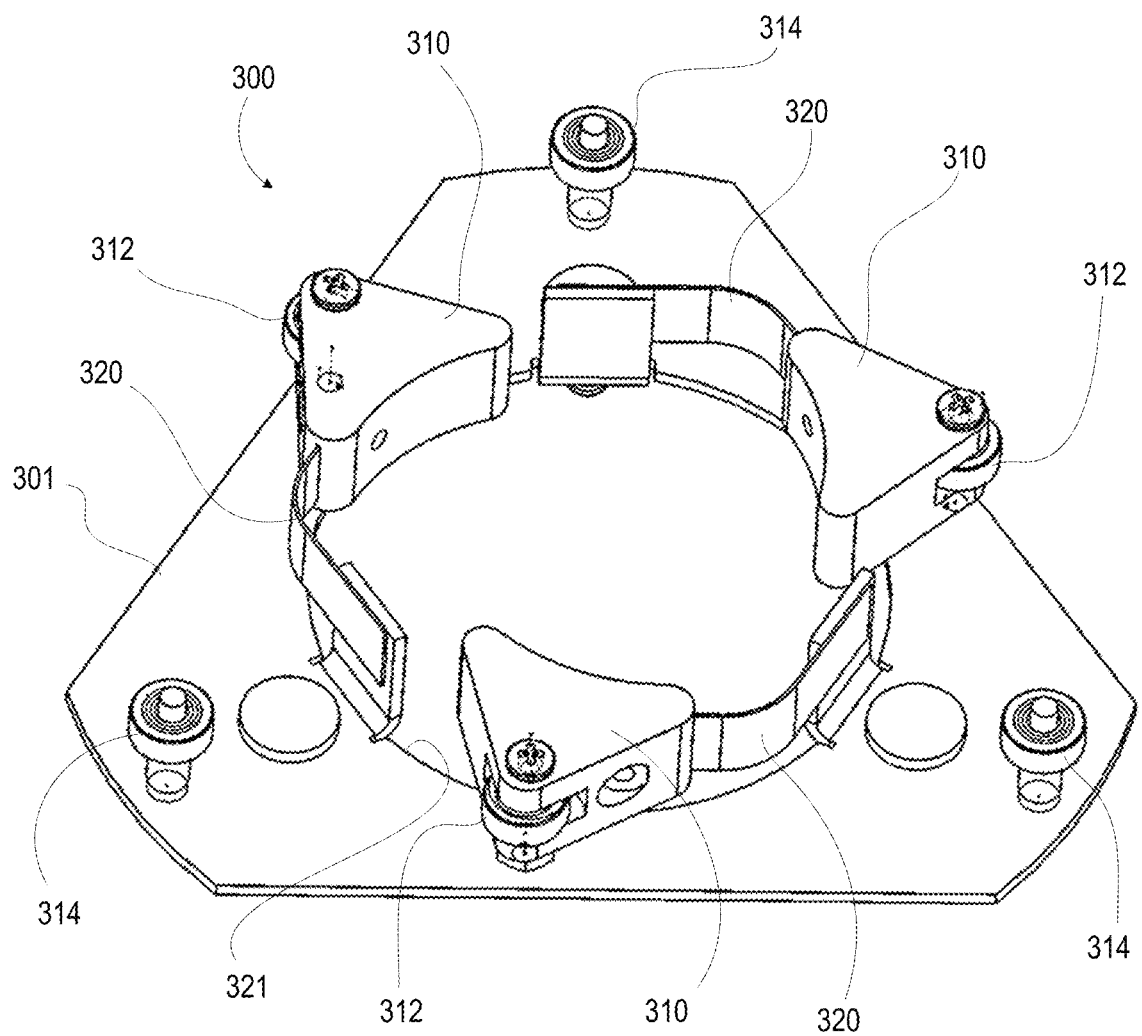
FIG. 16 depicts a bottom three-dimensional view of the stabilizer mounting plate of the stabilizer assembly having a central opening around which are attached outer roller bearings and spring bars with the attached cam followers and respective inner roller bearings, according to one or more embodiments.
Figure 17:
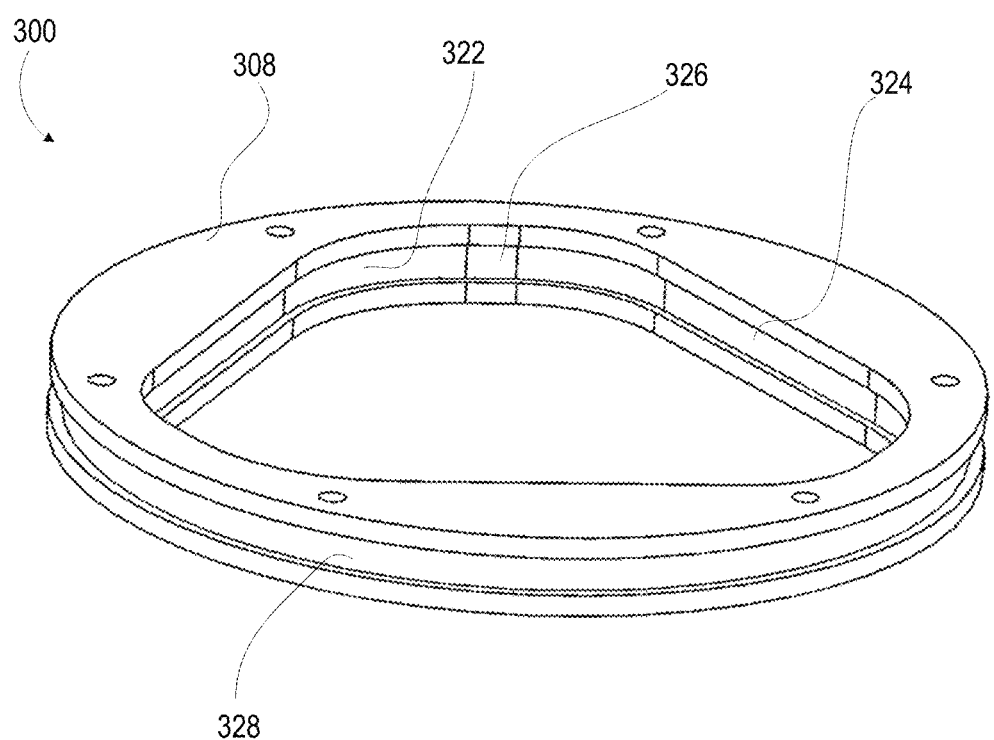
FIG. 17 depicts a three-dimensional view of the cam ring of the stabilizer assembly, according to one or more embodiments.

FIG. 16 depicts a bottom three-dimensional view of the stabilizer mounting plate 301 having a central opening 321 around which are attached outer roller bearings 314 and spring bars 320 with the attached cam followers 310 and respective inner roller bearings 312. FIG. 17 depicts a three-dimensional view of the cam ring 308 (FIG. 15). An inner race 322 of the cam ring 308 is a rounded triangular shape for receiving the inner roller bearings 312 and moving the attached cam followers 310 (FIG. 16) in unison. Radially closer sides 324 of the inner race 322 induce gripping. Radially farther corners 326 allow ungripping. An outer race 328 of the cam ring 308 is circular for engagement by the outer roller bearings 314 to allow the cam ring 308 to rotate a small amount clockwise and counterclockwise in relation to the stabilizer actuator arm 302 as affected by the central cam 306.

With particular reference to FIG. 15, the central cam 306 has a radially varying outer surface 330 with two concave indents 332 on opposite sides that imparts inward and outward motion to the arm roller bearing 304 and stabilizer actuator arm 302. Concave indents 332 are positioned to rotate the stabilizer actuator arm 302 is coupled to a lateral side of the cam ring 308 of the stabilizer assembly 300. Clockwise or counterclockwise rotation as viewed from below as depicted in turn imparts a rotation to the cam ring 308. The cam followers 310 are rotationally stationary, being mounted to the stabilizer mounting plate 301. The spring bars 320 urge the inner roller bearings 312 of the cam followers 310 outwardly to maintain engagement with the inner race 322 of the cam ring 308. The current position of the stabilizer cam arm 302 results in the arm roller bearing 304 being within one of the concave indents 332, releasing or ungripping the solid pepperoni stick 104 (FIG. 14). As a result, as the cutting disk assembly 112 rotates, the central cam 306 moves the stabilizer actuator arm 302, which then actuates the stabilizer assembly 300. This stabilizes and centers the solid pepperoni stick 104 (FIG. 14) during the cutting process. This stabilizing action during the cutting process produces cleanly cut slices, improving the pizza product.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

While the disclosure has been described with reference to exemplary embodiments, it will be understood by those skilled in the art that various changes may be made, and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A slicing machine comprising:
   an upper housing having at least one feeder tube that receives for an elongate food article for vertical movement;
   a cutting plate horizontally attached beneath the upper housing for rotation and positioned to perpendicularly receive the elongate food article at a position offset from a center of rotation of the cutting plate;
   at least one reverse involute cutting blade that slices the elongate food article, is attached to the cutting plate, and the at least one reverse involute cutting blade having a cutting edge with an upward bevel;
   a curved slot formed through the cutting plate beneath the cutting edge to receive slices of the elongate food article,
   a drive motor having a drive shaft that is mechanically coupled to the cutting plate at the center of rotation to rotate the cutting plate;
   a base housing positioned below the upper housing, wherein the base housing is received for lateral motion on a support frame to vary a lateral deposition of the slices, and wherein the base housing comprises:
   a pivoting handle for manual movement of the base housing on the support frame; and
   a switch responsive to pivoting of the pivoting handle to activate the drive motor and the turntable; and
   a turntable attached for rotation to the base housing and the turntable supports a food substrate that receives the slices of the elongate food article.

2. The slicing machine of claim 1, further comprising a control system that sets a first rotation speed of the drive motor and sets a second rotation speed of the turntable.

3. The slicing machine of claim 1, wherein the upper housing comprises an ice well in which the at least one feeder tube is exposed for cooling by ice added to the ice well.

4. The slicing machine of claim 1, wherein the feeder tube comprises a window, the slicing machine further comprising:
   a cam attached at a center axis to the cutting plate for rotation and comprising a radially varying outer surface with at least one concave indent;
   a support plate attached to the upper housing proximate to the cutting plate;
   a stabilizer assembly comprising a cam follower received for radial translation within a cam follower block attached to the support plate and a spring biases an inner end of the cam follower into engagement with the cam, the cam follower comprising a stabilizer tang on an out end that translates in and out of the window of the feeder tube to selectively stabilize the elongate food article based on the varying radius of the cam.

5. The slicing machine of claim 1, further comprising:
   a central cam attached at a center axis to the cutting plate for rotation and comprising a radially varying outer surface with at least one concave indent;
   a support plate attached to the upper housing proximate to the cutting plate; and
   a stabilizer assembly comprising:
      a mounting plate attached to an underside of the support plate and having a central opening for receiving the elongate food article and the mounting plate having more than one outer roller bearings circularly arrayed around the central opening;
      a cam ring having a circular outer race engaged to the outer roller bearings for rotation and the can ring having an inner race with alternating radially narrow and wide portions;
      more than one cam follower spring mounted to the mounting plate to engage the inner race; and
      a stabilizer actuator arm attached at one end to the cam ring and presenting at another end an arm roller bearing to radially varying outer surface to rotate the cam ring alternatingly between a gripping position and a released position of the more than one cam follower spring.

* * * * *